United States Patent [19]
Yanagi et al.

[11] Patent Number: 4,749,252
[45] Date of Patent: Jun. 7, 1988

[54] METHOD FOR SPLICING OPTICAL FIBERS

[75] Inventors: Tooru Yanagi; Yasuo Asano; Keiji Osaka; Mitsuaki Osanai, all of Yokohama, Japan

[73] Assignee: Sumitomo Electric Industries, Ltd., Osaka, Japan

[21] Appl. No.: 81,335

[22] Filed: Aug. 4, 1987

[30] Foreign Application Priority Data

Sep. 26, 1986 [JP] Japan .................................. 61-229236
May 29, 1987 [JP] Japan .................................. 62-136487

[51] Int. Cl.⁴ .............................................. G02B 6/38
[52] U.S. Cl. ................................................ 350/96.21
[58] Field of Search ................ 350/96.20, 96.21, 96.22

[56] References Cited

U.S. PATENT DOCUMENTS

| 4,290,668 | 9/1981 | Ellis et al. | 350/96.20 |
| 4,345,137 | 8/1982 | Mignien et al. | 350/96.21 |
| 4,367,011 | 1/1983 | Monaghan | 350/96.20 |
| 4,404,010 | 9/1983 | Bricheno et al. | 350/96.21 |
| 4,636,033 | 1/1987 | Gagen | 350/96.21 |
| 4,690,496 | 9/1987 | Bortolin et al. | 350/96.21 |

Primary Examiner—William L. Sikes
Assistant Examiner—Robert E. Wise
Attorney, Agent, or Firm—Cushman, Darby & Cushman

[57] ABSTRACT

A method for splicing coated optical fibers. The outer coating layer of two coated optical fiber ends to be joined is removed from respective end portions thereof. The inner optical fibers so exposed are then coated with a layer of UV-curable resin. After the resin layer has been hardened by irradiating it with ultraviolet radiation, the coated portion may be securely clamped without fear of damaging the optical fibers. The clamped end portions may then be moved toward one another in order that they may be fused together.

11 Claims, 4 Drawing Sheets

METHOD FOR SPLICING OPTICAL FIBERS

BACKGROUND OF THE INVENTION

1. Field of the Invention

The present invention relates to a method of splicing optical fibers to each other by means of a high-strength through fusion-splicing.

2. Description of the Prior Art

According to a known fusion-splicing method of splicing optical fibers, the following three steps are carried to prepare terminal portions of coated optical fiber to be joined:

(1) A jacket removing tool is used to remove about 4 cm of coating layer from the terminal portion of each coated optical fiber to expose bare glass fibers.

(2) The bare glass fiber is cleaned by wiping it with a gauze which has been infiltrated with a solvent such as alcohol, acetone, or the like.

(3) The bare portion of the optical fiber was then cut into a predetermined length.

The "prepared" coated optical fiber are then respectively mounted on fusion-splicers, as is shown in FIG. 4. Usually, the bare portion 1' of each of the optical fibers is directly fixed to the fusion-splicer by means of a V-shaped groove 33 that is formed in a fixing base 32, and secured therein by means of a clamping mechanism 34 formed to be complementary with the groove 33. At the same time, the coated optical fiber portion 1 is fixed between a fixing base 31 and a coated fiber clamping mechanism 35. The reference numerals 36 and 37 represent springs for urging clamping mechanisms 34 and 35, respectively. The respective end surfaces of the thus clamped bare glass fibers 1' are made to be opposite to and abut on each other, and their cores are manipulated in the X- and Y-directions as shown in FIG. 5 to align the respective axes thereof. Then, electric discharge was induced while one of the optical fibers was stuffed towards the other in the Z-direction to effect fusion splicing.

In FIG. 4, minute drive tables 38 39 38' 39' are provided for performing axial alignment of opposing fibers 1 and 1'. The fixing base 32, the V-shaped groove 33 and the clamping mechanism 34 are mounted integrally on the drive table 38 which is movable in X-direction only. Opposing fixing base 32', V-shaped groove 33' and the clamping mechanism 34' are mounted integrally on the drive table 38' which is movable in Y-direction only. The fixing base 31 and the coated fiber clamping mechanism 35 are mounted integrally on the drive table 39 which is movable in Z-direction only, and opposing fixing base 31' and the coated fiber clamping mechanism 35' are mounted integrally on the drive table 39' movable in Z-direction only.

This known fusion-splicing method is commonly used in factories, construction work sites, etc. However, the strength of the fusion-splicing between the optical fibers eventually deteriorates to about 1/10 of its initial strength for the following reasons:

(1) Since the terminal portions of the optical fibers are prepared by removing the coating layer by a mechanical procedure, for example, by forcibly removing or tearing off the coating layer, and since the bare fiber portion from which the coating layer has been removed is cleaned by wiping with a gauze, minute damages are generated in the bare portion of the optical fiber. Normally, in the optical fiber, the glass portion is in close contact with the coating layer. Conventionally, a tool such as the jacket remover is used to directly score the coating layer and pull the layer toward the tip end of the optical fiber. However, according to such method, minute damages are generated at the surface of the glass portion due to highly frictional force caused by the sliding movement of a blade of the tool and the coating layer relative to the surface of the glass. As a result, strength of the bare glass portion is excessively lowered.

(2) Since the bare optical fiber portion is directly clamped and fixed by means of the V-shaped groove and the fiber clamping mechanism, damages are generated in the bare optical fiber portion upon clamping thereof.

(3) After each of the bare optical fiber portions is fixed by means of the V-shaped groove and the fiber clamping mechanism, the bare optical fibers slippingly slide in Z-direction relative to the V-shaped groove and the clamping mechanism in order to perform axial alignment, end abutting and fusion-splicing of the two fibers. Therefore, damages are generated at the bare optical fibers due to their slippage in Z-direction.

(4) Since in the conventional fiber fusion splicer, the fixing base 31 (31') is not moved integrally with the fixing base 32 (32'), precise axial alignment relative to the opposing coated optical fibers may not be obtainable, particularly at the step of moving the fiber in Z-direction.

SUMMARY OF THE INVENTION

An object of the present invention is to provide an optical fiber splicing method which does not cause the strength of the optical fiber spliced portion to deteriorate. The method according to our invention includes the steps of chemical or mechanical removing the coating layers of the respective coated optical fiber to be spliced, forming a thin film layer of UV curable resin or other chemical resin around each of the exposed bare optical fiber, except for the cleaved end portion thereof, fixing each of the optical fibers at the thin film layer portion onto a fusion splicer, and splicing the optical fibers to each other. In the chemical removing step, the coating layers of the coated optical fibers are dissolved in a chemical. In the mechanical removing step, the coating layers are heated to expand the layers so that the layers are separated from the surfaces of glass fibers, and thereafter, the layers are removed to expose the bare glass fibers.

BRIEF DESCRIPTION OF THE DRAWINGS

FIGS. 1-3 are explanatory diagrams showing an embodiment of the splicing method according to the present invention, in which:

FIG. 1 is an explanatory schematic diagram showing the equipment for removing a coating layer at an end portion of a coated optical fiber (chemical removal);

FIG. 3 is a cross-sectional view of optical fiber fusion splicer according to the present invention;

DETAILED DESCRIPTION OF THE PREFERRED EMBODIMENT

Figure 1:
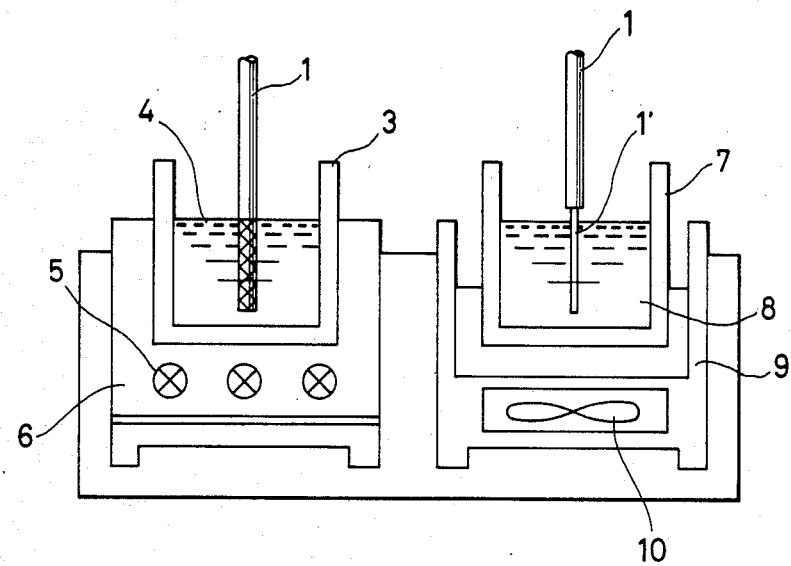
Figure 3:
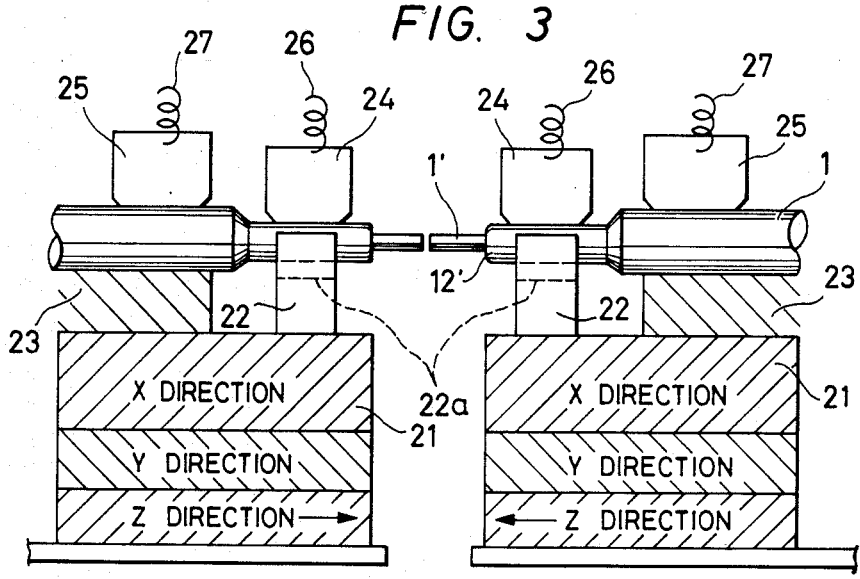

In an embodiment shown in FIGS. 1-3, a coating layer is chemically removed from a coated optical fiber.

FIG. 1 shows an equipment for removing a coating layer of a coated optical fiber at an end portion thereof. The equipment inlcudes a heating tank 6 provided with a heater 5, and an ultrasonic cleaner 9 which is provided with an ultrasonic-wave generator 10. The coating portion of an optical fiber is removed as follows. First, an end portion of a coated optical fiber 1 is dipped in chemicals 4 heated by the heater 5 so that the coating layer of the coated optical fiber 1 is swelled and dissolved. Second, the coating layer of optical fiber is removed. Then, the bare optical fiber 1' that has been exposed by the removal of the coating layer is dipped in chemicals 8 within the cleaner 9 and is subjected to vibrations generated by the ultrasonic-wave generator 10 in order to remove the chemicals, impurities, etc., that were attached to the bare optical fiber 1'.

The chemical 4 in a container 3 is sulfuric acid which is heated by the heater 5. If the sulfuric acid is not heated (is used at a room temperature), dissolvability of the coating layer is lowered, and it takes about 30 to 60 minutes for completely dissolving the layer in the acid. The chemical 8 in a container 7 is acetone which is used at room temperature. Acetone removes sulfuric acid and minute coating layer remained to the bare glass portion 1'. Alcohol may be used instead of acetone for cleaning the bare glass portion 1'. However, cleaning period when using alcohol is three times as long as that when using acetone.

FIGS. 2(a)-(d) are in general a diagram for explaining the procedure for forming a thin film layer of UV curable resin or other chemical resin on the cleaned bare optical fiber.

Figure 2A:
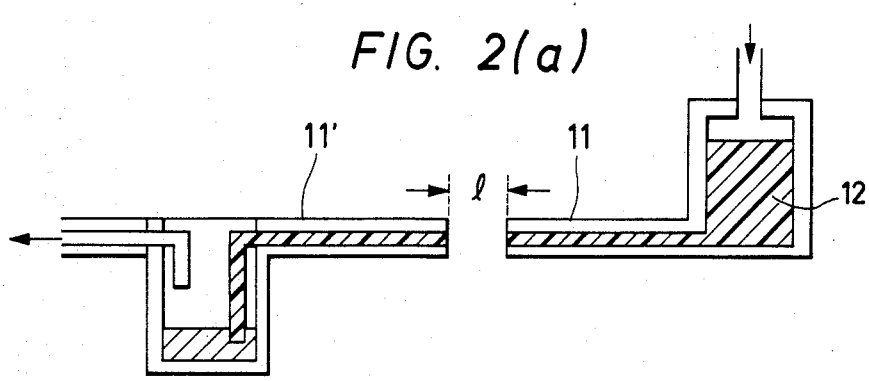
FIGS. 2(a)-(d) are explanatory schematic diagrams showing the procedure for forming a thin film layer of UV curable or other chemical resin on a bare optical fiber.
Figure 2B:
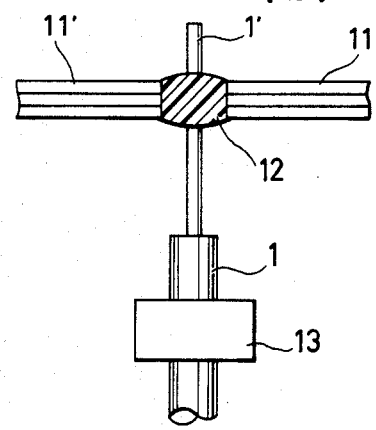
Figure 2C:
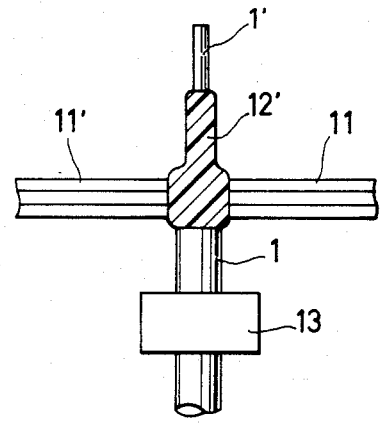
Figure 2D:
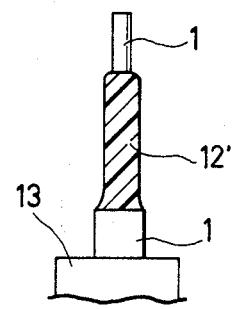
Figure 4:
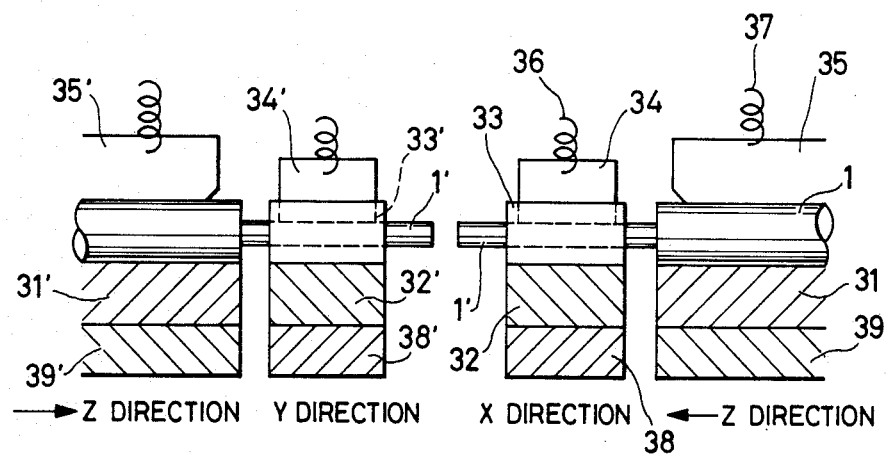
FIG. 4 is a cross-sectional view of a prior art optical fiber fusion splicer.

FIG. 2(a) shows an outline of a thin film coating equipment, in which a nozzle 11 for discharging UV curable resin 12 stored in a liquid tank and a nozzle 11' for sucking the UV curable resin 12 discharged from the nozzle 11 are disposed so as to be in opposition to each other with a gap 1 therebetween, so that the gap between the discharge nozzle 11 and the suction nozzle 11' may be filled with a predetermined quantity of the UV curable resin 12 that is discharged from the discharge nozzle 11. Then, as shown in FIG. 2(b), clamped by a clamp 13 is the coated optical fiber whose coating layer at the end portion thereof is removed and cleaned, at a position center of the UV curable resin 12 bridged between the nozzles 11 and 11'. (The remaining coating portion is clamped by the clamp 13.) In order to fix the position of the coated optical fiber 1 at the central portion of the UV curable resin, the coated optical fiber 1 is moved in a direction perpendicular to a sheet of the drawing, so that the cleaved end portion of the bare glass fiber 1' is not in contact with the bridged UV curable resin. Then, the nozzles 11 and 11' are caused to descend vertically in the axial direction of the optical fiber at a predetermined constant speed, so that a coating 12' of the UV curable resin is formed on the bare optical fiber 1'. At this time, a suction is formed at nozzle 11' to cause the nozzle 11' up to suck the excess of the UV curable resin, so that UV curable resin is uniformly formed along the longitude of the bare optical fiber 1'. The UV curable resin coating is uniformly formed because of viscosity and surface tension of the resin. The thus formed thin coating layer 12' of UV curable resin on the bare optical fiber 1' as shown in FIG. 2(d) is then irradiated with ultraviolet rays so as to harden the resin layer.

In the embodiment shown in FIGS. 2(a)-(d) the bare glass fiber 1' is inserted at a central portion of the UV curable resin bridged between the nozzles 11 and 11', and the coated optical fiber is clamped by the clamp 13, and thereafter the nozzles 11, 11' are caused to descend vertically in the axial direction of the optical fiber 1 to provide the coating layer 12' over the bare glass fiber 1'. However, another method is conceivable by clamping the coated optical fiber 1 by the clamp 13, and the fiber is caused to ascend vertically at a constant speed while the nozzles 11, 11' are maintained at their stationary positions to thereby form the coating layer 12'.

FIG. 3 shows the condition where the coated optical fiber to be spliced has been set onto a fusion-splicer. The coated optical fiber 1 provided with the bare optical fiber portion 1' having the thin film layer 12' of UV curable resin formed thereon, except for a cleaved end portion thereof as described above, is clamped on the top of the thin film layer 12' by means of a V-shaped groove 22a of a fixing base 22 and a clamp 24. At the same time, the coated optical fiber 1 is securely clamped by means of a fixing base 23 and a clamping mechanism 25. The above-mentioned V-shaped groove 22a and fixing base 23 are fixed on one of a pair of fine adjustment bases 21 which are aligned at the opposite sides of a discharge electrode (not shown) and are arranged to be finely movable in the X-, Y- and Z-directions.

Each of the fine alignment base 21 integrally provides three-stage driving unit which three-stages provide minute manipulation in X, Y, Z directions, respectively.

Theoretically, fiber alignment can be performed by moving only one of the fine alignment base 21 in three directions and maintaining of the other base 21 being stationary. However, since precise fiber alignment is required between the opposite fibers, it is preferable that both bases 21 are movable in three directions, because the bases only provide minute manipulations.

Figure 5:
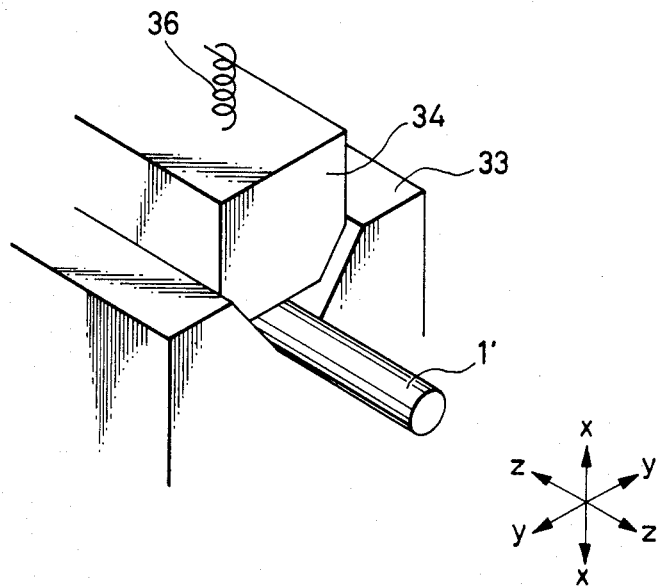
FIG. 5 is a perspective view showing a bare optical fiber that has been fixed by means of a V-shaped groove and a clamping mechanism.

Fine adjustment bases 21' are caused to finely move so as to make the respective axes of the opposite bare optical fibers 1' coincidental. Then, electric discharge is carried out, and simultaneously one of the optical fibers 1' is fed in the Z-direction (see FIG. 5) so as to be spliced by fusion to the other optical fiber.

Figure 6A:
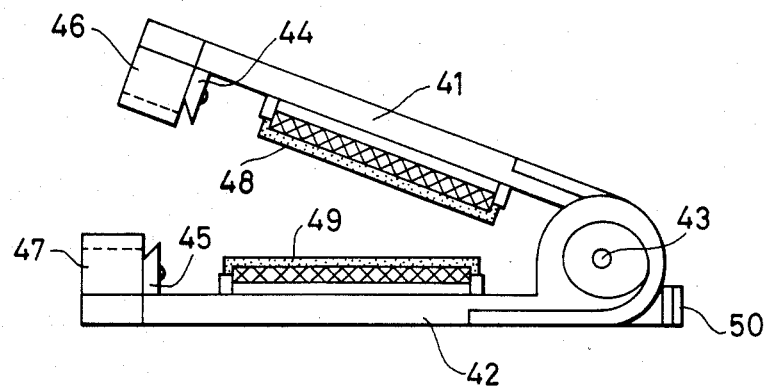
FIG. 6(a) and FIG. 6(b) show a tool for removing a coating layer from a coated optical fiber (mechanical removal).
Figure 6B:
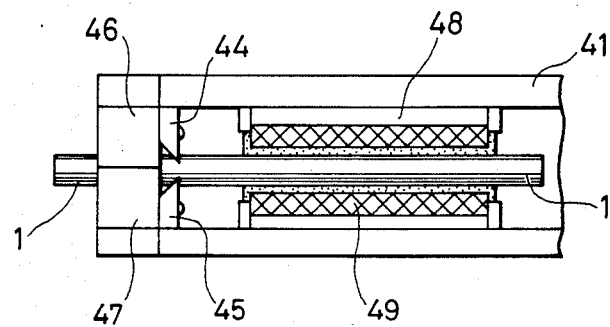

FIGS. 6(a) and 6(b) show another embodiment for removing the coating layer at the end portion of the coated optical fiber 1 (mechanical or physical removal). In this embodiment, the coating layer at the end portion of the coated optical fiber 1 is heated, so that the heated coating layer is swollen to thereby separate the layer from a surface of the optical fiber. Thereafter, thus separated coating layer is removed from the coated optical fiber to expose bare glass fiber. The optical fiber is then subjected to a UV curable resin coating and fusion splicing steps shown in FIGS. 2 and 3. According to the embodiment shown in FIGS. 6(a) and 6(b), the bare glass fiber is not subjected to any damage for the removal of the coating layer.

More specifically, in FIGS. 6(a) and 6(b), an upper frame member 41 is pivotally supported at a pivot shaft 43 to a lower frame member 42. Each of the frame members 41 and 42 is provided with heaters 48 and 49, respectively which are connectable to an electric power supply (not shown) through a terminal 50. Stoppers 46a nd 47 are provided at free ends of the frame members, and blades 44 and 45 are provided adjacent the stoppers. These stoppers and blades are positioned inside the frame members. The blades 44, 45 are adapted to score the coating layer of the coated optical fiber, and the stoppers are adapted to prevent the blades from cutting or scoring the surface of the bare glass fiber. As shown in FIG. 6(b), an end portion of the coated optical fiber 1 is interposed berween the heaters 48 and 49 upon closure of the frame members. In this case, the blades score the surface of the coating layer only. Normally, the bare glass fiber has a diameter of 125 $\mu$m, and therefore, the stoppers are adapted to render the opposed blades to provide a distance of about 150 to 180 $\mu$m upon closure of the frame member, so that any damage to the bare glass fiber is obviated. Upon application of heat to the coating layer, the layer is separated from the surface of the glass fiber because of the thermal expansion of the coating layer. The coated optical fiber 1 is pulled [leftwardly in FIG. 6(b)], so that the coating layer is removed at the scored portion. The coating layer in the internal space of the equipment shown in FIG. 6(b) is removed from the coated optical fiber. The heating temperature is dependent on the material of UV curable resin. However, generally, the temperature be 150°-200° C. for about 10 seconds.

The embodiment shown in FIGS. 6(a) and 6(b) is particularly advantageous for outdoor working, since it is not necessary to use dangerous chemicals. Further, this embodiment can provide the bare glass fiber without any damage to thus provide fiber end joining operation maintaining high strength at the joined poriton as in the case of chemical process described with reference to FIG. 1.

Conventionally, the removal of the coating layer and the cleaning operation of the end portion of a coated optical fiber has been carried out through a mechanical method using a tool such as jacket remover. In the splicing method according to the present invention, however, the coating layer is removed by (a) using chemicals and the removed portion of the coated optical fiber is cleaned by an ultrasonic cleaner, or (b) using heater to swell the coating layer and remove it from the glass fiber surface, so that it is possible to obtain a bare optical fiber having a clean end portion with no damages therein.

A thin film layer of UV curable resin is formed at a bare optical fiber portion and the optical fiber is fixed by means of a V-shaped groove and a clamping mechanism, so that nothing comes into direct contact with the bare optical fiber poriton that may damage.

In addition to the advantages of damage eliminaiton the invention is also more reliable than previously known arrangements. The mechanism portion such as fixing bases 22 and 23 are all provided on the single fine alignment base 21 integrally therewith so that the optical fiber moves together with the entire bases and clamping mechanism when it is moved in the Z-direction for the centering and fusion-splicing operations.

EXAMPLES

A coated optical fiber having a coating layer of ultraviolet curable resin and having a diameter of 0.25 mm was injured and cut by using a cutter. The terminal portions of the two cut coated-optical fiber pieces were inserted into a heating tank shown in FIG. 1 and dipped therein for about one minute. Then, the coating layers at the dipped portions were dissolved and removed.

The bare optical fibers from which the coating layers had been removed were inserted into an ultrasonic cleaner containing a solvent such as acetone, alcohol, or the like, and were subject to ultrasonic vibrations, so that dust of the coating resin, sufluric acid, dirt, etc., of the bare optical fibers was removed in about 30 seconds.

According to the procedure depicted in FIG. 2, a 5-10 $\mu$m thick thin film layer of UV curable resin was formed on each of the bare optical fibers and was irradiated with ultraviolet rays for several seconds so as to be hardened.

The thus prepared optical fibers were set and fixed by the V-shaped grooves and clamping mechanisms on the fusion splicers at the portions thereof where the thin film layers had been formed, as shown in FIG. 3, the fine alignment base was finely manipulated in the X- and the Y-direction so as to make the core axes coincide with each other, and then one of the optical fibers was stuffed towards the other in the Z-direction simultaneously with the generation of an electric discharge so as to carry out the fusion-splicing.

The tensile strength of the thus obtained optical fiber spliced portion was 2.0 kg at the average in 50 times testings, 3.0 kg at the maximum, and 1.5 kg at the minimum. Thus, a very strong splicing was obtained compared with that obtained through the prior art techniques discussed above, in which the strength was 0.7 kg in average, 1.1 kg in maximum, and 0.3 kg in minimum.

In the optical fiber splicing method according to the present invention, as described above, the factors which had been causes of deterioration in the strength of the conventional spliced portion are eliminated, and a very strong and very reliable splicing is provided.

While the invention has been described in splicing with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of splicing the end portions of a pair of coated optical fibers of the type having an optical fiber and an outer coating layer comprising the steps of:
    removing the outer coating layer from a predetermined length of each of said coated optical fibers proximate the end portions thereof to expose bare glass fibers;
    coating said bare glass fibers with a layer of resin except for the cleaved end portions thereof;
    causing the layer of resin to harden;
    clamping each of said coated optical fibers at a portion thereof that is covered with the hardened resin;
    aligning axes of said coated optical fibers; and
    fusion-splicing together said coated optical fibers.
2. The method of claim 1, wherein said removing is performed by dipping said end portions of said coated optical fibers into a first chemical for dissolving a material of said coating layers.
3. The method of claim 2, further comprising the step of cleaning said bare glass fibers by dipping them in a second chemical.
4. The method of claim 1, wherein said removing is performed by heating said end portions of said coated optical fibers for expanding and separating said coating layers from surfaces of said bare glass fibers; scoring said coating layers, and pulling said coating layers to expose said bare glass fibers.

5. The method of claim 1 wherein said coating is effected by each of said bare glass fibers, each being coated by:

providing a pair of first and second nozzles, said first and second nozzles being aligned and facing one another with a gap defined therebetween;

extruding a resin from one of said nozzles;

providing a suction in the other of said nozzles to maintain said resin between said gap; and passing the end portion of the optical fiber between said first and second nozzles, except for the outermost end portion thereof, whereby a smooth coating may be effected.

6. The method of claim 1, wherein in said step of causing the layer said resin to harden is effected by irradiating the resin layer with ultraviolet radiation.

7. The method of claim 1, wherein said coating step is carried out by using a UV curable resin as said resin.

8. The method of claim 1, wherein in said clamping step, each of said portion coated with the hardened resin is clamped between a V-shaped groove of a first fixing base and a first clamping mechanism, and remaining coated optical fiber is clamped by a second clamping mechanism and a second fixing base.

9. The method of claim 8, wherein in said aligning step, said first and second fixing bases are integrally mounted on a fine alignment base which are movable in X, Y, Z directions, so that said first and second fixing bases, said coated optical fibers and said first and second clamping mechanisms are integrally movable.

10. The method of claim 9, wherein in said fusion splicing step, said fine alignment base is moved in an axial direction (Z-direction) of said coated optical fibers.

11. The method of claim 1, wherein said fusion splicing is performed by electric discharge.

* * * * *